United States Patent [19]

Richardson

[11] Patent Number: 5,636,952
[45] Date of Patent: Jun. 10, 1997

[54] LOAD BLOCKER

[75] Inventor: Mark G. Richardson, San Antonio, Tex.

[73] Assignee: H. E. Butt Grocery Company, San Antonio, Tex.

[21] Appl. No.: 570,465

[22] Filed: Nov. 8, 1995

Related U.S. Application Data

[63] Continuation of Ser. No. 213,721, Mar. 16, 1994, abandoned.

[51] Int. Cl.$^6$ .................................................. B61D 45/00
[52] U.S. Cl. ........................... 410/121; 414/786; 410/156; 410/35; 410/46
[58] Field of Search ........................ 410/34, 35, 46, 410/121, 122, 153, 156; 414/786

[56] References Cited

U.S. PATENT DOCUMENTS

| | | | |
|---|---|---|---|
| 4,147,112 | 4/1979 | Green et al. | 105/463 |
| 4,338,053 | 7/1982 | Abel | 410/94 |
| 4,515,506 | 5/1985 | Van Gompel et al. | 410/46 |
| 4,756,651 | 7/1988 | Van Gompel et al. | 410/46 |

*Primary Examiner*—David A. Bucci
*Assistant Examiner*—Gregory A. Morse
*Attorney, Agent, or Firm*—Vinson & Elkins, L.L.P.

[57] ABSTRACT

A cargo blocker is disclosed for preventing displacement of palletized cargo in a moving vehicle. The cargo blocker includes a footplate adapted to be received under one edge of a loaded cargo pallet and a resilient brace attached to and extending generally upwardly from the footplate. The brace and the footplate form, in an unstressed condition, an acute angle of slightly less than 90°. When the footplate is confined under a loaded cargo pallet, the vertical brace will be flexed with respect to the footplate. The resulting torque will exert a compressive force on the cargo contained on the pallet, to prevent dislodgement of the cargo.

12 Claims, 2 Drawing Sheets

LOAD BLOCKER

This is a continuation of Ser. No. 08/213,721, filed Mar. 16, 1994, and now abandoned.

BACKGROUND OF THE INVENTION

The present Invention is directed to a method and apparatus for holding cargo, especially palletized cargo, in position inside a partially loaded vehicle.

Cargo moved in vehicles such as trucks, trailers, rail cars and airplanes commonly is placed upon pallets for ease of handling by forklifts or other mechanized equipment. Even cargo which may be unloaded manually, at different locations, frequently is loaded by forklift, and therefore palletized.

When trucks, trailers and the like handling palletized cargo are loaded to less than capacity, or where initially full-capacity loads are partially depleted by deliveries, there is a necessity for restraining the remaining palletized cargo in the partially filled vehicle so that it will not vibrate around the cargo space, become dislodged or the like while the vehicle is in motion. For this purpose, a variety of devices are available. Known generally as "load locks" they involve the use of bars, hoops, gates, curtains, netting or the like which extends between, and are attached to, opposed walls, or in some cases between the floor and ceiling, of the cargo area. Some cargo trailers come from the factory with grids installed along the walls for the purpose of engaging load lockers at desired locations.

Several drawbacks are presented by prior art load lockers. Each is specific to a particular truck, trailer or other cargo vehicle, so that they usually are not interchangeable between vehicles. Cargo locking points are provided only at discrete locations along the length of the cargo area. Therefore, it often is necessary to rearrange cargo or to "fill" between the palletized cargo and the pre-set load locking points in order for the load locks to be effective. The grids, latches or other means on the walls of the trailers for engaging the load lockers may damage cargo as it is loaded or unloaded. In some instances, the load lockers are designed to exert compression or torsion on the cargo. These may cause the walls of the trailers to bow outward, or may exert such compression or on the cargo as to damage fragile cargo boxes.

SUMMARY OF THE INVENTION

It is the primary object of the invention to provide an improved cargo blocking system and apparatus for restraining palletized cargo in a partially filled trailer or other cargo handling vehicle.

Another object is to provide such a system and apparatus which is simple and inexpensive and which can be interchanged between vehicles.

A further object is to provide such a system and apparatus which does not rely upon any engagement with the walls or other parts of the cargo vehicle and does not utilize grids, latches or other means for locking the cargo at predetermined positions in the cargo vehicle.

In accordance with the present invention, a cargo blocker is provided which utilizes a substantially flat footplate adapted to be received under one edge of a cargo pallet and a resilient vertical brace means attached to and extending upwardly from the footplate. The footplate and vertical brace portions of the cargo blocker form an acute angle of slightly less than 90° and are resilient, so that when the footplate is confined under a loaded cargo pallet, the vertical brace will be flexed with respect to the footplate. The resulting torque will exert a compressive force on the cargo being restrained, preventing dislodgement of cargo as the vehicle moves. The load blocker preferably is dimensions so that it can be inserted between the tines of a standard forklift, used to lift the palletized cargo. Additionally, an empty pallet, disposed vertically, or other barrier means, may be interposed between the vertical brace of the cargo blocker and the palletized cargo, to spread the effect of the cargo blocker over a larger area of cargo.

These and other objects and advantages of the invention will become apparent from the following detailed description of the preferred embodiment of the invention and from the accompanying drawings, in which like numerals indicate like parts.

DETAILED DESCRIPTION OF THE INVENTION

Figure 1:
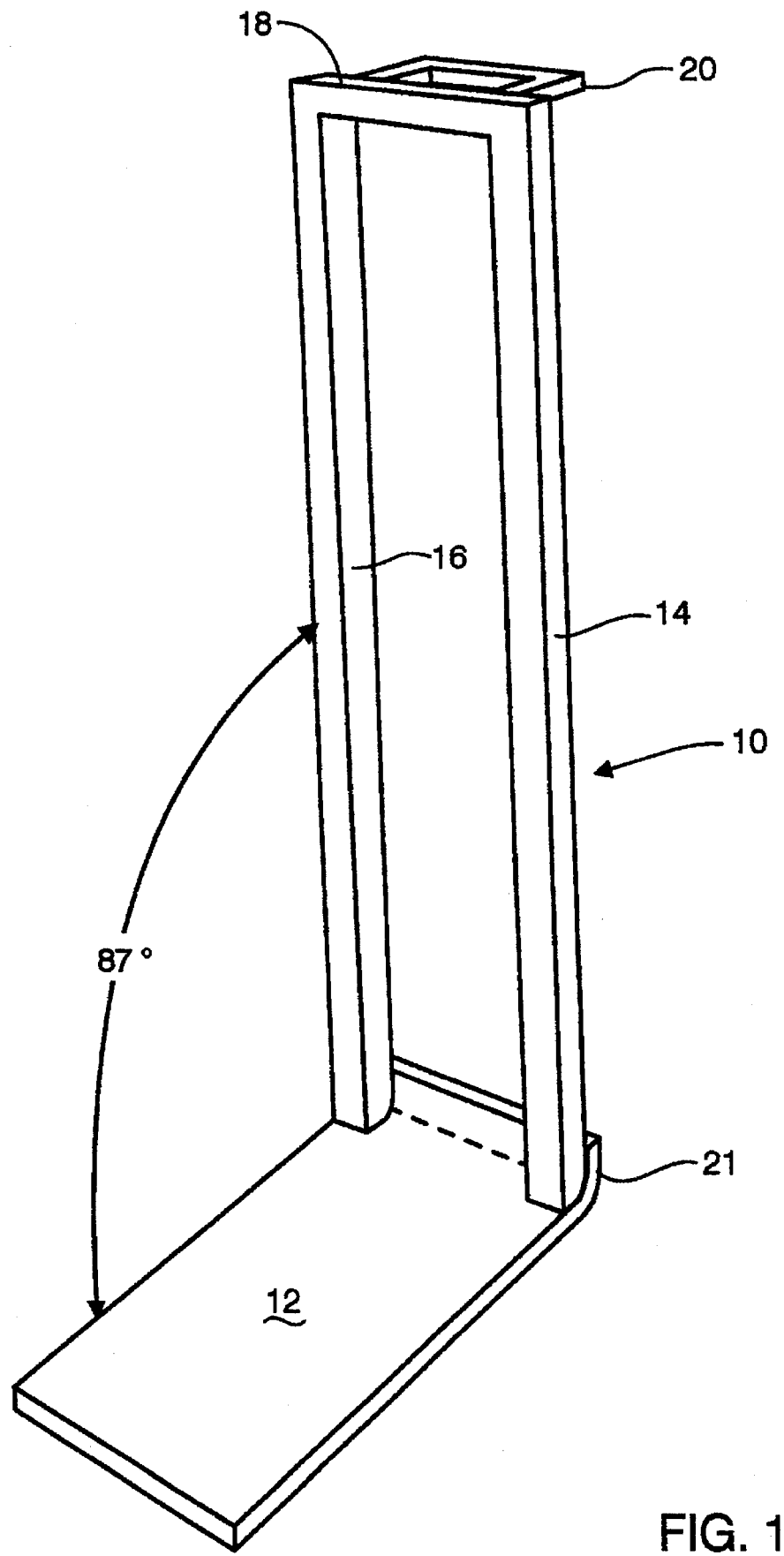
FIG. 1 is a perspective view of a load blocker in accordance with the present invention.
Figure 2:
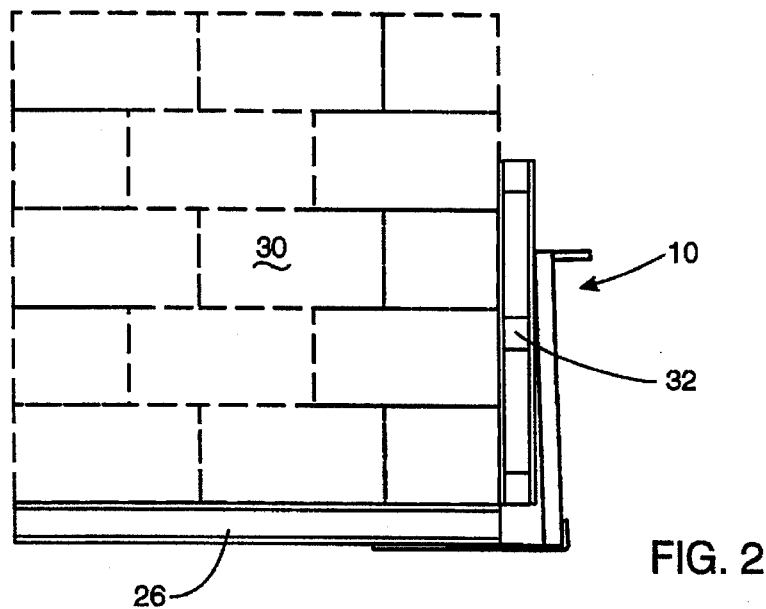
FIG. 2 is a side elevational view of the load blocker of FIG. 1, engaging a load of palletized cargo.
Figure 3:
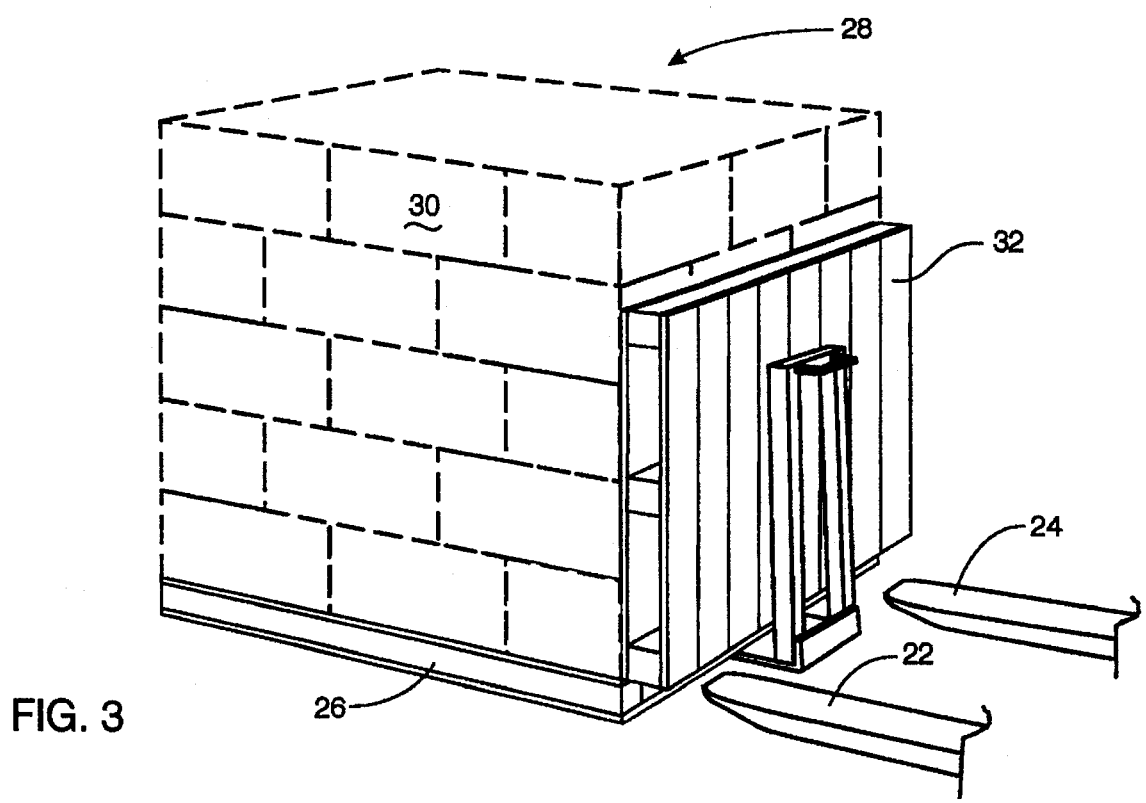
FIG. 3 is a perspective view of the load blocker and cargo of FIG. 2, illustrating how the load blocker fits between the tines of a forklift being used to lift the palletized cargo for insertion of the load blocker.

Referring to FIG. 1, there is illustrated a load blocker 10 in accordance with the present invention. It comprises a footplate 12 with a resilient vertical brace means attached to one edge of the footplate. The brace means is comprised of two substantially vertical legs 14, 16 joined at the top by cross bar 18. A handle 20 is attached and extends horizontally of the cross bar 18. All parts of the load blocker preferably are of metal, but may be formed of other strong, resilient material such as fiberglass or hard plastic. The vertical brace is attached to the footplate, with at least a portion of the brace forming at an acute angle of slightly less than 90° with the footplate. About 87° is the preferred angle between the vertical legs and the footplate when the cargo blocker is in an unstressed condition. The brace means is capable of being flexed slightly with respect to the footplate, to form an angle at least about 90°, without plastic deformation. To increase strength and resiliency of the load blocker, the rear edge of the footplate preferably is curved upward to form a substantially vertical portion 21, with the vertical legs 14, 16 being welded to both the horizontal and vertical portions of the footplate. While dimensions are not critical, the foot and vertical brace preferably have a width which will permit the load blocker to be inserted between the tines of a conventional forklift. The length of the footplate and the height of the brace may be varied, as desired, depending upon the weight and height of the palletized cargo being blocked. In the preferred embodiment, the footplate has a length of about 12 inches, a width of about 8 inches, and the vertical brace is about 36 inches high.

In using the load blocker, the tines 22, 24 of a conventional forklift (not shown) are inserted under one edge of a loaded cargo pallet 26. Although the cargo pallet 26 is illustrated as being of conventional wooden construction, cast plastic, fiberboard and other types of cargo pallets also may be used. Palletized cargo 28, comprising a number of stacked discrete articles, cartons, crates or the like 30, is stacked on the cargo pallet 26. The discrete items of cargo 30 may be strapped, shrink wrapped or otherwise restrained with respect to the cargo pallet 26, or may be stacked loose or in nested configuration, depending upon the nature of the cargo.

Tines 22, 24 of the forklift are raised so as to lift the cargo pallet slightly, or, alternatively, to tilt the cargo pallet slightly so as to raise one edge sufficiently to permit the insertion of the footplate 12 of the load blocker under the edge of the cargo pallet 26. The pallet also could be tilted manually, with the use of a pry bar, etc. An empty pallet 32 preferably is inserted in a vertical position between the palletized cargo to be blocked and the vertical brace of the cargo blocker. The vertical pallet 32 provides barrier means for spreading the bracing effect of the cargo blocker over a larger area of cargo. Alternatively, any other desired form of barrier may be used in lieu of a cargo pallet, or a grid, web or the like may be formed integrally with, or attached to, the brace portion of the cargo blocker to perform this function. The load blocker then is moved into snug engagement, with the footplate filly inserted under the horizontal pallet 26 and the pallet 32 or other barrier snugged up against the side of the palletized cargo. The forklift tines are lowered, so that the bottom cargo pallet 26 will rest on the footplate 12 of the cargo blocker. The weight of the palletized cargo and the substantially right angle formed between the vertical pallet 32 and the horizontal pallet 26 will cause the vertical legs 14, 16 of the cargo blocker to deform slightly with respect to the footplate, to form a larger acute angle, a substantially right angle even or a slightly obtuse angle, with respect to the footplate 12. The tendency of the resilient vertical brace and the footplate to resume their acute relationship will cause a spring or torque effect. This spring or torque effect causes a compressive, cargo-retaining force to be exerted by the cargo blocker against the barrier pallet 32 and through it to the palletized cargo 30. A proportional torque or spring force will be exerted upwardly by the footplate 12 as it attempts to resume its more acute, unstressed, angle with respect to the back brace of the load blocker. This resilient torque force, or spring effect, retains the cargo blocker 10, barrier 32 and cargo 30 in position, and prevents dislodgement of the palletized cargo, despite normal vibrations of the moving vehicle.

Although only one load blocker is shown in the illustrations, it will be apparent that additional load blockers can be used on other free sides of the palletized cargo, so as to avoid dislodging cargo during transit.

The foregoing disclosure and description of the invention are illustrative only, and various changes in the size, shape and materials of construction may be made within the scope of the appended claims without departing from the spirit of the invention.

What is claimed is:

1. An apparatus for preventing dislodgment during transit of cargo on a pallet, said apparatus comprising:
    a footplate having a horizontal portion adapted to be received under one edge of a pallet loaded with cargo and confined between the bottom of said pallet and the floor on which said pallet rests,
    resilient brace means attached to and extending upwardly from said footplate and having a cargo-engaging portion adapted to engage a vertical edge of said cargo on said pallet,
    said horizontal portion of said footplate and said cargo-engaging portion of said brace means forming, in an unstressed condition, an angle of less than 90° with respect to each other,
    said brace means having sufficient resilience with respect to said footplate so that said cargo-engaging portion of said brace means may be deformed angularly with respect to said horizontal portion of said footplate so as to form an angle of at least about 90° with respect to each other, without plastic deformation of said brace means or said footplate, when said horizontal portion of said footplate is received under one edge of the pallet and said cargo-engaging portion of said brace means is engaged with said cargo, and
    said brace means having sufficient resilience with respect to said footplate so that when said apparatus is positioned with said horizontal portion of said footplate under one edge of said pallet loaded with cargo and said cargo-engaging portion of said brace means engaged with said cargo, and said cargo-engaging portion of said brace means is deformed to a less acute angle than it assumed in its unstressed condition with respect to said horizontal portion of said footplate, the resulting torque force between said resilient brace means and said footplate will exert a compressive force against said cargo and said pallet sufficient to prevent dislodgement of said cargo.

2. The apparatus according to claim 1 wherein said apparatus is dimensioned to fit between the tines of a forklift adapted to lift said pallet and cargo.

3. The apparatus according to claim 1 wherein said horizontal portion of said footplate and said cargo-engaging portion of said resilient brace means form, in an unstressed condition, an acute angle of about 89° or less with respect to each other.

4. The apparatus according to claim 1 wherein said horizontal portion of said footplate and said cargo-engaging portion of said resilient brace means form, in an unstressed condition, an angle of about 87° with respect to each other.

5. The apparatus according to claim 1 wherein said brace means comprises a pair of spaced legs attached at their lower ends to said footplate and joined at their upper ends by a cross bar.

6. A load blocker for preventing dislodgement during transit of cargo on a pallet, said cargo blocker comprising:
    a footplate adapted to be received under one edge of a pallet loaded with cargo and confined between said pallet and the floor on which said pallet rests, said footplate having an upper surface adapted to engage said pallet and a lower surface adapted to engage said floor;
    resilient brace means attached to and extending substantially upwardly from said footplate and having a cargo-engaging portion adapted to engage a vertical edge of said cargo on said pallet,
    said upper surface of said footplate and said cargo-engaging portion of said brace means forming, in an unstressed condition, an acute angle of about 89° or less with respect to each other,
    said resilient brace means having sufficient resilience with respect to said footplate so that said cargo-engaging portion of said resilient brace means may be deformed angularly with respect to said upper surface of said footplate to an angle of at least about 90° with respect to said upper surface of said footplate without plastic deformation of said brace means or said footplate; and
    said resilient brace means and said footplate being adapted, when said cargo-engaging portion of said resilient brace means is deformed angularly to a less acute angle than it assumed in its unstressed condition with respect to said upper surface of said footplate, to create a torque force between said footplate and said brace means, whereby said footplate and said cargo-engaging portion of said brace means will exert compressive forces against said cargo and said pallet of sufficient magnitude to prevent dislodgement of said cargo during transit.

7. The apparatus according to claim 6 wherein said upper surface of said footplate and said cargo-engaging portion of said resilient brace means form, in an unstressed condition, an angle of about 87° with respect to each other.

8. The apparatus according to claim 6 wherein said resilient brace means and said footplate are fabricated of steel.

9. A method for blocking cargo on a pallet to prevent dislodgement of said cargo during transit in a vehicle, said method comprising:

provideing in said vehicle a load blocker having a horizontal footplate with resilient brace means attached to and extending upwardly therefrom, said footplate portion of said load blocker being adapted to be confined between the bottom of said pallet and the floor of said vehicle and said resilient brace means having a cargo-engaging portion adapted to engage a vertical edge of said cargo, said footplate and said cargo-engaging portion of said brace means forming, in an unstressed condition, an angle of less than 90° with respect to each other;

lifting one edge of said cargo pallet with said cargo thereon sufficiently to permit insertion of said footplate portion of said load blocker under said edge of said pallet;

positioning said load blocker with said footplate portion inserted under said lifted edge of said cargo pallet and with said cargo-engaging portion of said resilient brace means engaging said cargo; and lowering said pallet onto said footplate, thereby causing said brace means to be displaced angularly resiliently away from said footplate and creating a torque force between said brace means and said footplate, said torque force exerting a compressive force from said resilient brace means against a portion of said cargo and from said footplate against said pallet of sufficient magnitude to prevent dislodgement of said cargo during transit.

10. The method according to claim 9 comprising additionally providing in said vehicle a load spreading barrier means; and positioning said load spreading barrier means between said cargo and said cargo-engaging portion of said brace means of said load blocker;

whereby said compressive force from said brace means is exerted on said barrier and by said barrier on said cargo.

11. The method according to claim 9 wherein said footplate and said cargo-engaging portion of said brace means form, in an unstressed condition, an acute angle of about 89° or less with respect to each other.

12. The method according to claim 9 wherein said footplate and said cargo-engaging portion of said brace means form, in an unstressed condition, an acute angle of about 87° with respect to each other.

* * * * *